United States Patent
Li

(10) Patent No.: US 8,787,642 B2
(45) Date of Patent: Jul. 22, 2014

(54) METHOD, DEVICE AND COMPUTER-READABLE RECORDING MEDIUM CONTAINING PROGRAM FOR EXTRACTING OBJECT REGION OF INTEREST

(75) Inventor: Yuanzhong Li, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 894 days.

(21) Appl. No.: 12/058,734

(22) Filed: Mar. 30, 2008

(65) Prior Publication Data
US 2008/0247619 A1 Oct. 9, 2008

(30) Foreign Application Priority Data
Mar. 29, 2007 (JP) ................................. 2007-087838

(51) Int. Cl.
*G06K 9/00* (2006.01)
*G06K 9/34* (2006.01)
*G06T 7/00* (2006.01)

(52) U.S. Cl.
CPC .................................... *G06T 7/0079* (2013.01)
USPC ........... 382/131; 382/128; 382/173; 348/169; 600/407

(58) Field of Classification Search
CPC ........... G06T 2207/10081; G06T 2207/20072; G06T 2207/20101; G06T 2207/20132; G06T 2207/20144; G06T 7/0079; G06T 17/00; A61B 8/00; A61B 6/03; G06K 9/00
USPC ................. 382/128, 131, 132, 154, 173, 260; 348/42, 61, 65, 135, 169; 600/407; 345/419, 424
See application file for complete search history.

(56) References Cited

U.S. PATENT DOCUMENTS

| | | | | |
|---|---|---|---|---|
| 6,075,879 | A * | 6/2000 | Roehrig et al. | 382/132 |
| 6,434,215 | B1 * | 8/2002 | Cesmeli | 378/8 |
| 6,785,409 | B1 * | 8/2004 | Suri | 382/128 |
| 6,882,743 | B2 * | 4/2005 | Bansal et al. | 382/131 |
| 7,418,120 | B2 * | 8/2008 | Weiner et al. | 382/128 |
| 7,738,701 | B2 * | 6/2010 | Matsumoto | 382/173 |
| 7,751,626 | B2 * | 7/2010 | Neemuchwala et al. | 382/203 |

(Continued)

FOREIGN PATENT DOCUMENTS

| | | | |
|---|---|---|---|
| JP | 2006-239005 A | 9/2006 | |
| WO | WO 2008141293 | * 5/2008 | G06K 9/46 |

OTHER PUBLICATIONS

Fenster et al. "Three Dimensional US Imaging and Its Use in Quantifying Organ and Pathology Volumes" Anal Bioanal Chem (2003) pp. 1-8.*

(Continued)

*Primary Examiner* — Chan Park
*Assistant Examiner* — Mia M Thomas
(74) *Attorney, Agent, or Firm* — Sughrue Mion, PLLC

(57) ABSTRACT

An object region extracting process for extracting an object region of interest from an image is automated to the maximum possible extent to improve user-friendliness. In this process, an arbitrary point is set in the object region of interest, and a presence area, which is likely to contain the entire object region of interest, is determined in the image using the set arbitrary point and a possible size of the object region of interest. Then, the object region of interest is extracted from the image based on the set arbitrary point and at least one point outside the determined presence area.

8 Claims, 4 Drawing Sheets

(56) References Cited

U.S. PATENT DOCUMENTS

| | | | |
|---|---|---|---|
| 2003/0099391 A1* | 5/2003 | Bansal et al. | 382/131 |
| 2003/0171668 A1* | 9/2003 | Tsujino et al. | 600/407 |
| 2003/0194132 A1* | 10/2003 | Kiyuna | 382/190 |
| 2003/0223627 A1* | 12/2003 | Yoshida et al. | 382/128 |
| 2004/0008886 A1* | 1/2004 | Boykov | 382/173 |
| 2004/0066955 A1* | 4/2004 | Tamez-Pena et al. | 382/128 |
| 2004/0106864 A1* | 6/2004 | Rose et al. | 600/410 |
| 2005/0002546 A1* | 1/2005 | Florent et al. | 382/128 |
| 2005/0078857 A1* | 4/2005 | Park | 382/128 |
| 2005/0143639 A1* | 6/2005 | Matsumoto | 600/407 |
| 2006/0004278 A1* | 1/2006 | Giger et al. | 600/408 |
| 2006/0177125 A1* | 8/2006 | Chan et al. | 382/154 |
| 2006/0247525 A1* | 11/2006 | Huo et al. | 600/437 |
| 2007/0019846 A1* | 1/2007 | Bullitt et al. | 382/128 |
| 2007/0110310 A1* | 5/2007 | Unal et al. | 382/173 |
| 2007/0230763 A1* | 10/2007 | Matsumoto et al. | 382/131 |
| 2008/0068456 A1* | 3/2008 | Fujii et al. | 348/130 |
| 2008/0075348 A1* | 3/2008 | Rappaport et al. | 382/132 |
| 2008/0101672 A1* | 5/2008 | Matsumoto | 382/128 |
| 2008/0243395 A1* | 10/2008 | Oosawa et al. | 702/19 |
| 2009/0003676 A1* | 1/2009 | Li | 382/131 |
| 2009/0016491 A1* | 1/2009 | Li | 378/98.5 |
| 2009/0180677 A1* | 7/2009 | Li et al. | 382/131 |
| 2010/0092055 A1* | 4/2010 | Matsuda | 382/128 |
| 2010/0166321 A1* | 7/2010 | Sawant et al. | 382/209 |
| 2010/0189319 A1* | 7/2010 | Wu et al. | 382/128 |
| 2011/0075913 A1* | 3/2011 | Moriya | 382/132 |
| 2013/0051645 A1* | 2/2013 | Kim et al. | 382/131 |

OTHER PUBLICATIONS

R. Tachibana et al., "Automatic segmentation of pulmonary nodules on CT images by use of NCI Lung Image Database Consortium", Proc. of SPIE, 2006, pp. 61440M-1-61440M-9, vol. 6144.

K. Suzuki et al., "Comparsion between 2D and 3D massive-training ANNs (MTANNs) in CAD for lung nodule detection on MDCT", Int J CARS 1, 2006, pp. 354-357.

Yuri Y Boykov et al., "Interactive Graph Cuts for Optimal Boundary & Region Segmentation of Objects in N-D images", Proceedings of International Conference on Computer Vision, 2001, pp. 105-112, vol. 1, Vancouver, Canada.

* cited by examiner

METHOD, DEVICE AND COMPUTER-READABLE RECORDING MEDIUM CONTAINING PROGRAM FOR EXTRACTING OBJECT REGION OF INTEREST

BACKGROUND OF THE INVENTION

1. Field of the Invention

The present invention relates to a method, a device and a computer-readable recording medium containing a program for extracting an object region of interest from an image, and in particular to a method, a device and a computer-readable recording medium containing a program for extracting an object region of interest, such as a lesion region or an organ region from a medical image.

2. Description of the Related Art

In the medical field, a process of extracting and displaying a certain object region of interest, such as a lesion region or an organ region, from a medical image has conventionally been conducted to provide an image with high diagnosis performance.

An example of the method for extracting an object region from an image is described, for example, in US Patent Application Publication No. 20040008886, where the user specifies certain pixels in the image representing an object region and other certain pixels in the image representing a background region. Then, a probability indicating whether each pixel represents the object or the background is calculated based on information of the marked pixels, and a probability indicating whether or not each combination of neighboring pixels are pixels belonging to the same region is calculated based on a local density difference in the image. Then, the object region is extracted from the image using these probabilities.

Another example of the method for extracting an object region from an image is proposed in R. Tachibana and S. Kido, "Automatic segmentation of pulmonary nodules on CT images by use of NCI Lung Image Database Consortium", Proc. of SPIE, Vol. 6144, pp. 61440M-1-61440M-9, 2006 where the user specifies certain pixels in the image representing an object region and other certain pixels in the image representing a background region, and these pixels are respectively used as reference points for region growing for the object region and reference points for region growing for the background region. Then, a probability indicating whether or not each combination of neighboring pixels are pixels belonging to the same region is calculated based on a local density difference in the image. Then, each reference point is subjected to region growing using the probability, and a boundary is created along points where the grown object region and the grown background region meet, to extract the object region from the image.

In the techniques proposed in these documents, however, the user is required to manually specify certain pixels representing an object region and other certain pixels representing a background region in the image, and this is troublesome. Therefore, it is desired to reduce troublesomeness of the manual input by the user.

SUMMARY OF THE INVENTION

In view of the above-described circumstances, the present invention is directed to providing a method, a device and a computer-readable recording medium containing a program for extracting an object region of interest, in which a process of extracting the object region is automated to the maximum possible extent to improve user-friendliness.

An aspect of the invention is a method for extracting an object region of interest from an image. The method includes: setting an arbitrary point in the object region of interest; determining a presence area in the image using the set arbitrary point and a possible size of the object region of interest, the presence area being likely to contain the entire object region of interest; and extracting the object region of interest from the image based on the set arbitrary point and at least one point outside the determined presence area.

Another aspect of the invention is a device for extracting an object region of interest from an image. The device includes: setting means to set an arbitrary point in the object region of interest; area determining means to determine a presence area in the image using the set arbitrary point and a possible size of the object region of interest, the presence area being likely to contain the entire object region of interest; and object region extracting means to extract the object region of interest from the image based on the set arbitrary point and at least one point outside the determined presence area.

Yet another aspect of the invention is a computer-readable recording medium containing a program for causing a computer to carry out a process for extracting an object region of interest from an image. The process includes: setting an arbitrary point in the object region of interest; determining a presence area in the image using the set arbitrary point and a possible size of the object region of interest, the presence area being likely to contain the entire object region of interest; and extracting the object region of interest from the image based on the set arbitrary point and at least one point outside the determined presence area.

The object region of interest may be a lesion region in the medical image or an organ region in the medical image.

DESCRIPTION OF THE PREFERRED EMBODIMENTS

Figure 1:
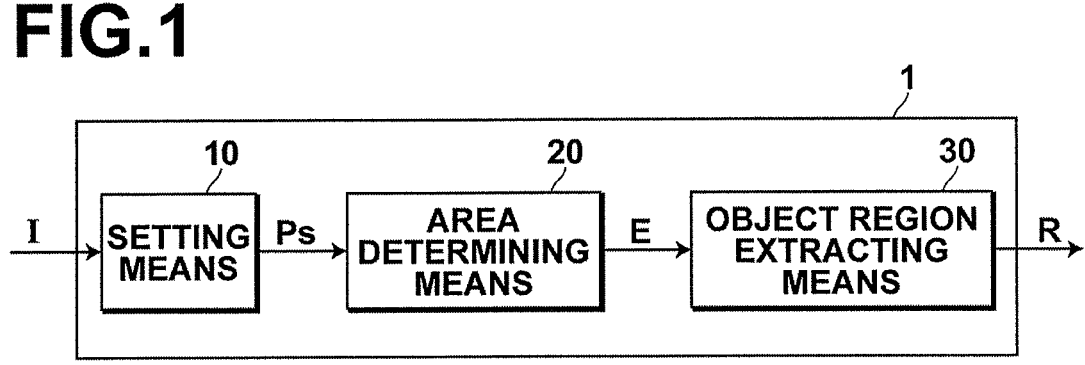
FIG. 1 is a block diagram illustrating one embodiment of an object region extracting device of the present invention.

Hereinafter, an embodiment of an object region extracting device of the present invention will be described with reference to the drawings, where the object region extracting device extracts a lesion region from a two-dimensional medical image. It should be noted that the configuration of the object region extracting device 1 shown in FIG. 1 is implemented by executing an object region extracting program, which has been read in an auxiliary storage device, on a computer (such as a personal computer). The object region extracting program to be installed on the computer may be stored in an information storage medium, such as a CD-ROM, or may be distributed over a network, such as the Internet.

The object region extracting device 1 extracts a lesion region R from a medical image I, which has been taken with an imaging apparatus such as a CT apparatus. As shown in FIG. 1, the object region extracting device 1 includes: a setting means 10 to set an arbitrary point Ps in the lesion region R; an area determining means 20 to determine a presence area E, within which the entire lesion region R may possibly be contained, in the medical image I using the arbitrary point Ps and a possible size L of the lesion region R; and an object region extracting means 30 to extract the lesion region R from the medical image I based on the arbitrary point Ps and a point outside the presence area E.

The setting means 10 sets the arbitrary point Ps in the lesion region R contained in the medical image I which has been taken with an imaging apparatus such as a CT apparatus. The setting means 10 may set the arbitrary point Ps at a position, for example, of a chest nodule detected by using a chest nodule detection method as described in K. Suzuki et al., "Comparison between 2D and 3D massive-training ANNs (MTANNs) in CAD for lung nodule detection on MDCT", Int J CARS 1, pp. 354-357, 2006. Alternatively, the user may specify a position on the medical image I, which is displayed on an image display device, using a position specifying means, such as a mouse or a keyboard, provided to the object region extracting device 1, and the position specified by the user may be set as the arbitrary point Ps.

The arbitrary point Ps is formed by one or more points set in the lesion region R. The arbitrary point may be set at a rough center of the lesion region R, or may be set out of the center of the lesion region R.

The area determining means 20 determines the presence area E within which the entire lesion region R may possibly be contained, i.e., an area that is likely to contain the entire lesion region R, in the medical image I using the arbitrary point Ps and the possible size L of the lesion region R. Specifically, the presence area E is determined such that the size of the presence area E is equal to or larger than the possible size L of the lesion region R, and the rough center of the area is set at the position of the arbitrary point Ps (if there are two or more arbitrary points Ps, at the center position between the points).

The size of the presence area E is determined to be equal to or larger than the possible size L of the lesion region R, for example, 1.5 times the possible size L of the lesion region R, so that the presence area E having the rough center thereof set at the arbitrary point Ps can contain the entire lesion region R even when the arbitrary point Ps is set at a position out of the center of the lesion region R.

The possible size L of the lesion region R is a physically-possible maximum size of the lesion region. The possible size L of the lesion region R may be a size (the number of pixels) on the medical image I, which is obtained by dividing the physically possible maximum size of the lesion represented by the lesion region R by a size represented by one pixel on the medical image I. Alternatively, the largest one of sizes of lesion regions contained in a number of medical images may be used as the possible size L of the lesion region R. The possible size L of the lesion region R may be determined by any other method.

Figure 2:
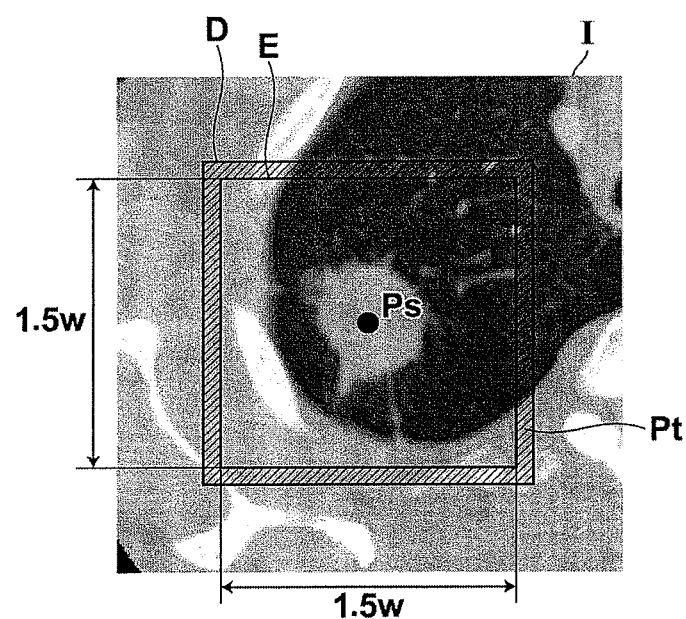
FIG. 2 is a diagram for explaining one example of a method for determining a presence area by an area determining means shown in FIG. 1.

As shown in FIG. 2, for example, on a two-dimensional medical image I containing the lesion region R representing a chest nodule, if a physically possible maximum width of the chest nodule represented by the lesion region R on the medical image I is 30 mm and a size represented by one pixel on the medical image I is 0.5 mm×0.5 mm in the vertical and horizontal directions, then the maximum width is 60 pixels (30 mm/0.5 mm) on the medical image I. Therefore, a width W of the possible size of the lesion region R may be determined to be 60 pixels, and the presence area E may be determined to be a square area of 90×90 pixels (90 pixels is 1.5 times the width W in this case), with the center of the presence area E being positioned at the arbitrary point Ps set in the lesion region.

It should be noted that a peripheral shape of the presence area E may take any of various shapes, such as a square, a circle or an ellipse.

The object region extracting means 30 extracts the lesion region R from the medical image I based on the arbitrary point Ps and a point Pt outside the presence area E. For example, an area to be determined D containing the presence area E is set on the medical image I. Then, based on the fact that the arbitrary point Ps is a pixel representing the lesion region R and the one or more points Pt set outside the presence area E are pixels representing the background region, the area to be determined D is segmented into the lesion region R and the background region to extract the lesion region R according to a Graph Cut region segmentation method described in Yuri Y. Boykov and Marie-Pierre Jolly, "Interactive Graph Cuts for Optimal Boundary & Region Segmentation of Objects in N-D images", Proceedings of "International Conference on Computer Vision", Vancouver, Canada, Vol. I, pp. 105-112, 2001.

Figure 3:
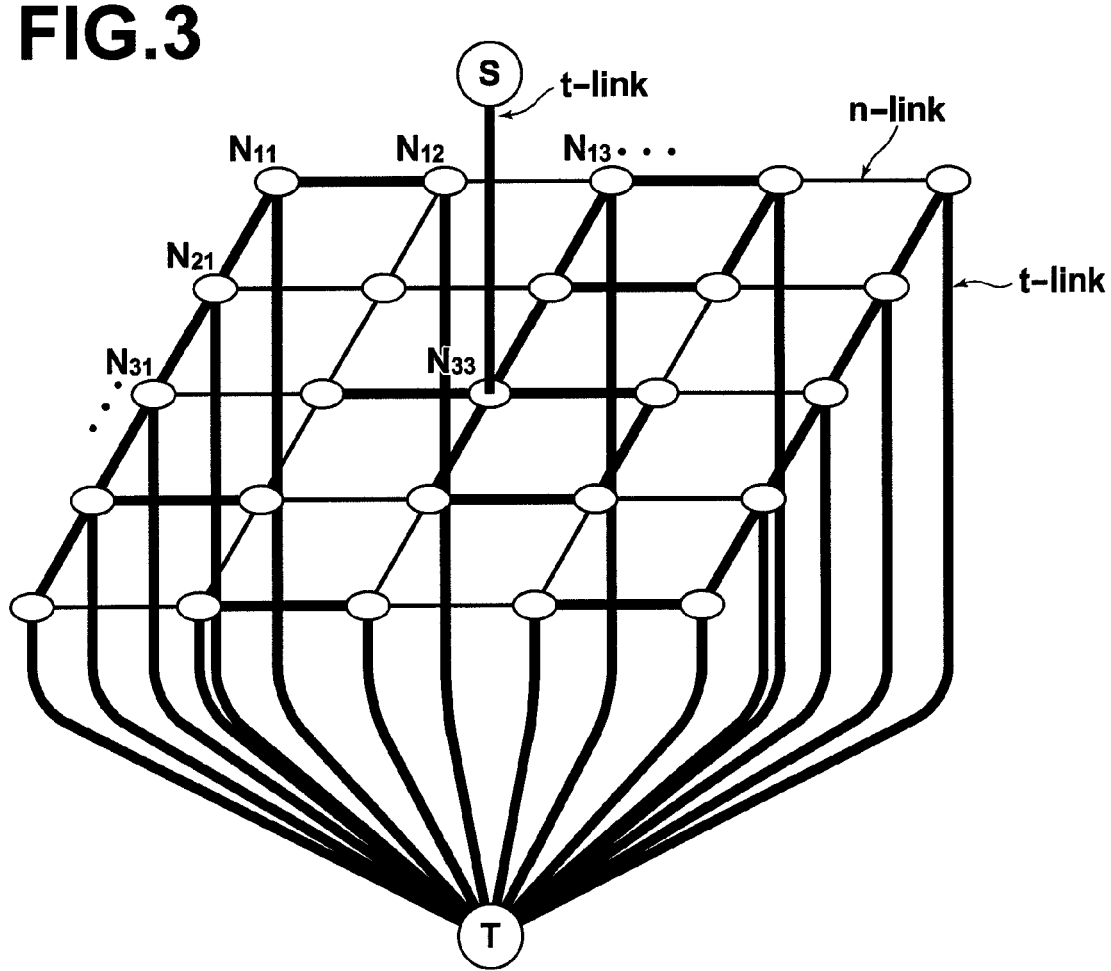
FIG. 3 is diagram for explaining one example of how an object region of interest is extracted by an object region extracting means shown in FIG. 1.

In this segmentation method, first, as shown in FIG. 3, a graph is created, which includes nodes Nij representing respective pixels in the area to be determined D, nodes S and T representing labels (the lesion region R and the background region in this embodiment) that the pixels may take, n-links connecting nodes of neighboring pixels to each other, and t-links connecting the nodes Nij representing the pixels respectively to the node S representing the lesion region or the node T representing the background region of the lesion. The thickness of each n-link indicates a probability of each pair of neighboring pixels being pixels belonging to the same region. The probability is calculated based on a distance between the neighboring pixels and a difference between pixel values of the neighboring pixels.

Each t-link that connects each node Nij representing a pixel to the node S representing the lesion region R indicates a probability of the pixel being a pixel in the lesion region R, and each t-link that connects each node representing a pixel to the node T representing the background region R indicates a probability of the pixel being a pixel in the background region R. If information about whether each pixel belongs to the lesion region R or the background region has already been given, these probabilities can be set according to the given information. If such information is not given, the probabilities can be calculated based on statistic characteristics of pixel values of one or more pixels which have been known as being pixels in the lesion region R or in the background region.

Since the arbitrary point Ps is a pixel set in the lesion region, a thick t-link is set to connect a node N33 representing the point Ps to the node S representing the lesion region, as shown in FIG. 3. Further, since the points Pt set outside the presence area E are pixels representing the background region, thick t-links are set to connect respective nodes N11, N12, . . . , N15, N21, N25, N31 representing the respective points Pt to the node T representing the background region.

Figure 4:
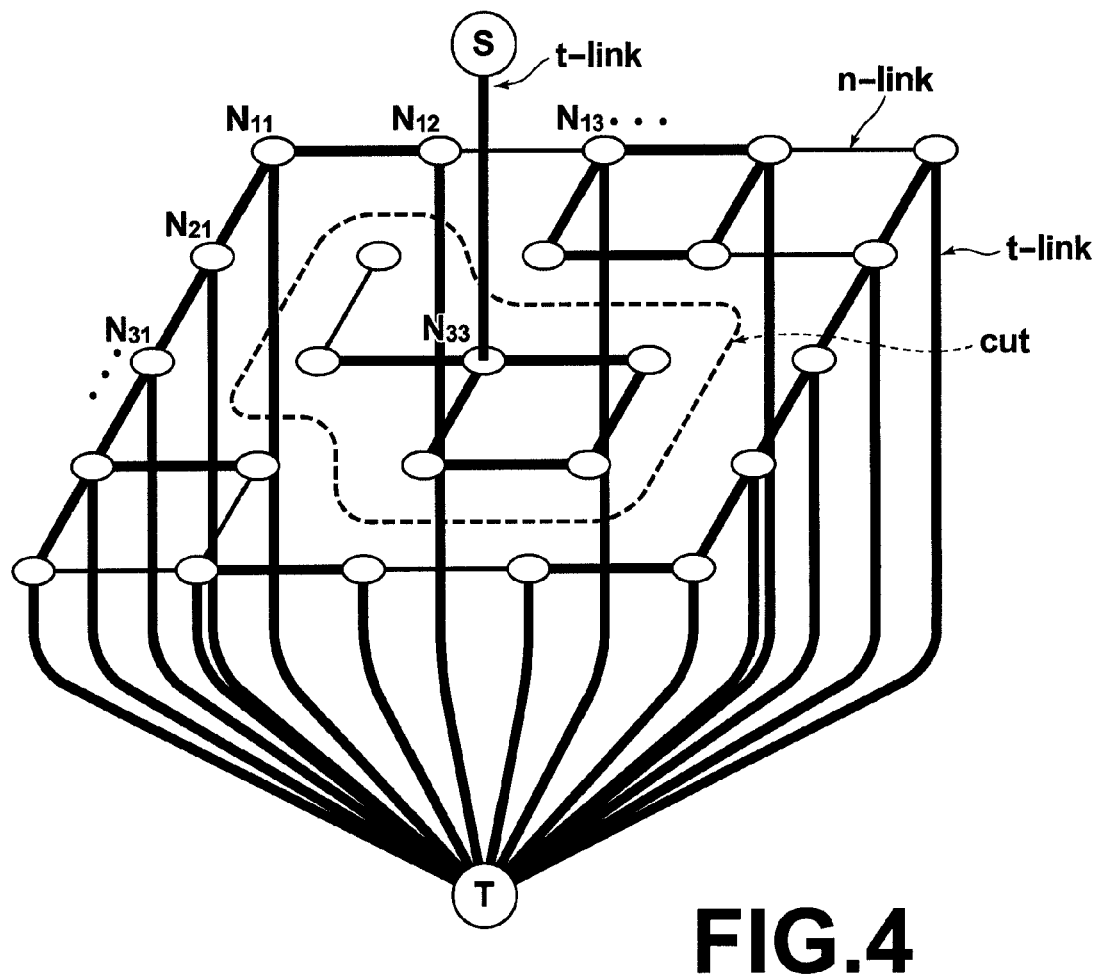
FIG. 4 is diagram for explaining one example of how the object region of interest is extracted by the object region extracting means shown in FIG. 1.
Figure 5:
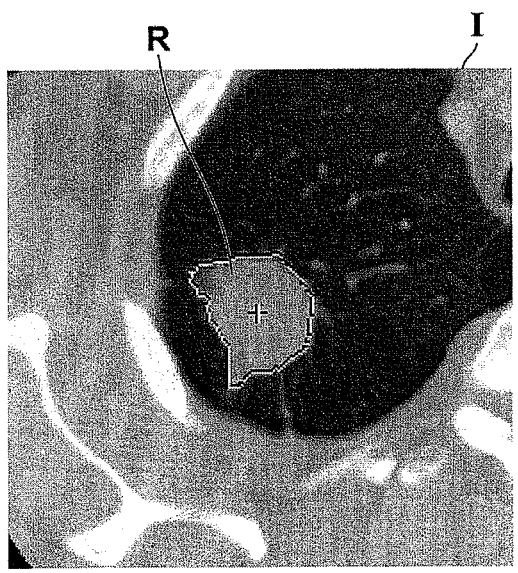
FIG. 5 is a diagram illustrating one example of the object region of interest extracted by the object region extracting device of the invention.

Since the lesion region R and the background region are mutually exclusive regions, for example, as indicated by dashed lines in FIG. 4, appropriate links among all the t-links and n-links are cut to separate off the node S from the node T to segment the area to be determined D into the lesion region R and the background region. At this time, optimal region segmentation can be achieved by cutting the t-links and the n-links such that a sum of the probability values of all the links to be cut becomes minimum. One example of the lesion region R extracted by the above-described region segmentation is shown in FIG. 5. In FIG. 5, the contour of the lesion region R is indicated by solid lines.

Figure 6:
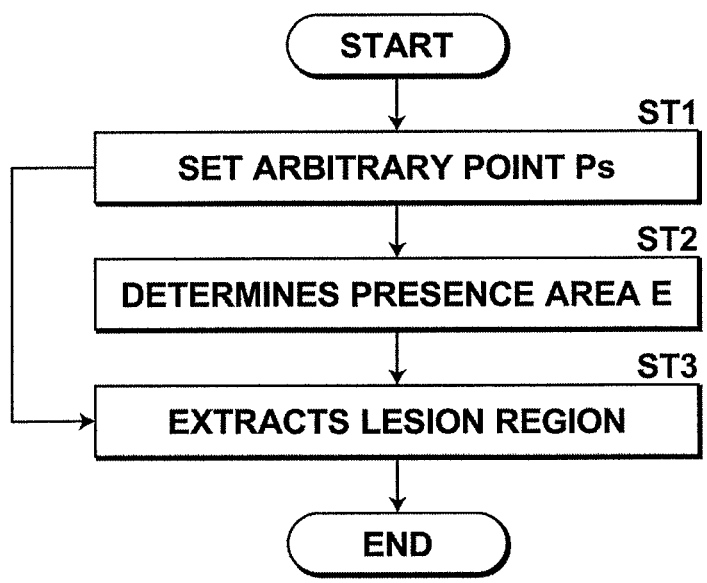
FIG. 6 is a flow chart illustrating one embodiment of an object region extracting method of the invention.

Now, an object region extracting method of the invention will be described with reference to a flow chart shown in FIG. 6. First, the setting means 10 sets the arbitrary point Ps in the lesion region in the medical image I (step ST1). Then, the area determining means 20 determines the presence area E, within which the entire lesion region R may possibly be contained, in the medical image I based on the arbitrary point Ps set in step ST1 and the possible size L of the lesion region R (step ST2). Subsequently, the object region extracting means 30 extracts the lesion region from the medical image I based on the arbitrary point Ps set in step ST1 and the point Pt outside the presence area E determined in step ST2 (step ST3).

According to the above-described embodiment, in order to extract an object region of interest from an image, an arbitrary point is set in the object region of interest, and a presence area, within which the entire object region of interest may possibly be contained, is determined in the image using the set arbitrary point and a possible size of the object region of interest. Then, the object region of interest is extracted from the image based on the set arbitrary point and a point outside the determined presence area. In the conventional object region extracting methods, the user is required to manually specify certain pixels representing the object region of interest and other certain pixels representing the background region in the image. In contrast, the point outside the determined presence area is used as a pixel representing the background region in this method, which means that the operation of manually specifying the pixel representing the background region is automated. Therefore, troublesomeness of manual input is reduced, thereby providing improved user-friendliness.

Although the object region of interest is extracted from the two-dimensional image in the above-described embodiment of the object region extracting device of the invention, the object region of interest can also be extracted from a three-dimensional image. For example, the setting means 10 sets in the object region of interest in the three-dimensional image an arbitrary point Ps in a three-dimensional coordinate system. Then, the area determining means 20 determines a three-dimensional presence area E, within which the entire object region of interest may possibly be contained, in the image using the arbitrary point Ps and a possible size L of the object region of interest. Then, the object region extracting means 30 extracts a three-dimensional object region of interest from the image based on the arbitrary point Ps and a point Pt outside the presence area E, using the above-described segmentation method or any other method. In this case, the peripheral shape of the presence area E may take any of various shapes, such as a hexahedron or a sphere.

It should be noted that, in the object region extracting device of the invention, the possible size of the object region of interest means a physically possible maximum size for sizes of the same type of object regions. In a case where two or more object regions of interest are extracted from an image using the object region extracting device of the invention, a list of possible sizes of object regions determined for respective types of object regions may be prepared and referenced to appropriately determine the presence area for each type of the object region of interest to be extracted.

It should be noted that the object region may be an organ region representing an organ, such as liver, spleen or kidney, or a lesion region representing a lesion, such as brain tumor, chest nodule, liver tumor, liver cyst or kidney cyst.

According to the method, the device and the computer-readable recording medium containing the program for extracting an object region of interest from an image, in order to extract an object region of interest from an image, an arbitrary point is set in the object region of interest, and a presence area, within which the entire object region of interest may possibly be contained, is determined in the image using the set arbitrary point and a possible size of the object region of interest. Then, the object region of interest is extracted from the image based on the set arbitrary point and a point outside the determined presence area. In contrast to the conventional object region extracting methods where the user is required to manually specify certain pixels representing the object region of interest and other certain pixels representing the background region in the image, the point outside the determined presence area is used as a pixel representing the background region in this method, which means that the operation of manually specifying the pixel representing the background region is automated. Therefore, troublesomeness of manual input is reduced, thereby providing improved user-friendliness.

What is claimed is:

1. A method for extracting a lesion region from an image, the method comprising:
   setting an arbitrary point in the lesion region; determining a presence area containing the set arbitrary point, the size of the presence area being larger than a reference size of the lesion region, said reference size being a maximum size of lesions appearing in recorded images that are of a type identical to the lesion region; and
   extracting the lesion region from the image based on the set arbitrary point and at least one point outside the determined presence area, wherein the set arbitrary point and the at least one point outside the determined presence area are within a single image from which the lesion region is being extracted, and wherein the lesion region is extracted based on a graph cut segmentation method using data of the arbitrary point as a first label, and data of the point outside the determined presence area as a second label, and wherein within the presence area, each pixel is assigned to one of the first label and the second label based on a probability of each pixel corresponding a group of the first label or the second label.

2. The method of claim 1, wherein extracting the lesion region further determines a probability of each set of neighboring pixels located within the presence area as corresponding to the same label.

3. The method of claim 2, wherein a link cost is assigned to each probability determination for each pixel within the presence area as assigned to the first label, a link cost is assigned to each probability determination for each pixel as assigned to the second label, and a link cost is assigned to the probability of each set of neighboring pixels belonging to said first label or said second label, and wherein a reiterative determination is made which severs the link costs for each pixel in the presence area, and the minimum link cost of the reiterative determination provides the extracted lesion region.

4. A device for extracting a lesion region from an image, the device comprising:
   setting means to set an arbitrary point in the lesion region;
   area determining means to determine a presence area containing the set arbitrary point, the size of which is equal to or larger than a possible size of the lesion region said possible size being a maximum size of lesion regions, in recorded images, that are of a type identical to the lesion region; and object region extracting means to extract the lesion region from the image based on the set arbitrary point and at least one point outside the determined presence area, and wherein the object region extracting means extracts the lesion region based on a graph cut segmentation method using data of the arbitrary point as a first label, and data of the point outside the determined presence area as a second label, and wherein within the presence area, each pixel is assigned to one of the first label and the second label based on a probability of each pixel corresponding a group of the first label or the second label.

5. A non-transitory computer-readable recording medium containing a program for causing a computer to carry out a process for extracting a lesion region from an image, the process comprising:

setting an arbitrary point in the lesion region; determining a presence area containing the set arbitrary point, the size of which is equal to or larger than a possible size of the lesion region said possible size being a maximum size of lesion regions, in recorded images, that are of a type identical to the lesion region; and extracting the lesion region from the image based on the set arbitrary point and at least one point outside the determined presence area, wherein the lesion region is extracted based on a graph cut segmentation method using data of the arbitrary point as a first label, and data of the point outside the determined presence area as a second label, and wherein within the presence area, each pixel is assigned to one of the first label and the second label based on a probability of each pixel corresponding a group of the first label or the second label.

6. A method for extracting an organ region from an image, the method comprising:

setting an arbitrary point in the organ region; determining a presence area containing the set arbitrary point, the size of which is equal to or larger than a possible size of the organ region said possible size being a maximum size of organ regions, in recorded images, that are of a type identical to the organ region; and extracting the organ region from the image based on the set arbitrary point and at least one point outside the determined presence area, and wherein the organ region is extracted based on a graph cut segmentation method using data of the arbitrary point as a first label, and data of the point outside the determined presence area as a second label, and wherein within the presence area, each pixel is assigned to one of the first label and the second label based on a probability of each pixel corresponding a group of the first label or the second label.

7. A device for extracting an organ region from an image, the device comprising:

setting means to set an arbitrary point in the organ region;

area determining means to determine a presence area containing the set arbitrary point, the size of which is equal to or larger than a possible size of the organ region said possible size being a maximum size of organ regions, in recorded images, that are of a type identical to the organ region; and object region extracting means to extract the organ region from the image based on the set arbitrary point and at least one point outside the determined presence area, and wherein the object region extracting means extracts the organ region based on a graph cut segmentation method using data of the arbitrary point as a first label, and data of the point outside the determined presence area as a second label, and wherein within the presence area, each pixel is assigned to one of the first label and the second label based on a probability of each pixel corresponding a group of the first label or the second label.

8. A non-transitory computer-readable recording medium containing a program for causing a computer to carry out a process for extracting an organ region from an image, the process comprising:

setting an arbitrary point in the organ region; determining a presence area containing the set arbitrary point, the size of which is equal to or larger than a possible size of the organ region said possible size being a maximum size of organ regions, in recorded images, that are of a type identical to the organ region; and extracting the organ region from the image based on the set arbitrary point and at least one point outside the determined presence area, and wherein the organ region is extracted based on a graph cut segmentation method using data of the arbitrary point as a first label, and data of the point outside the determined presence area as a second label, and wherein within the presence area, each pixel is assigned to one of the first label and the second label based on a probability of each pixel corresponding a group of the first label or the second label.

* * * * *